(12) United States Patent
Mukherjee

(10) Patent No.: US 7,373,558 B2
(45) Date of Patent: May 13, 2008

(54) VECTORING PROCESS-KILL ERRORS TO AN APPLICATION PROGRAM

(75) Inventor: Shubhendu S. Mukherjee, Framingham, MA (US)

(73) Assignee: Intel Corporation, Santa Clara, CA (US)

(*) Notice: Subject to any disclaimer, the term of this patent is extended or adjusted under 35 U.S.C. 154(b) by 665 days.

(21) Appl. No.: 10/947,961

(22) Filed: Sep. 23, 2004

(65) Prior Publication Data

US 2006/0075300 A1    Apr. 6, 2006

(51) Int. Cl.
*G06F 11/00* (2006.01)

(52) U.S. Cl. .......................... 714/48; 714/10

(58) Field of Classification Search ............ 714/48, 714/57, 10
See application file for complete search history.

(56) References Cited

U.S. PATENT DOCUMENTS

| | | | |
|---|---|---|---|
| 5,784,394 A | 7/1998 | Alvarez et al. ............. | 714/800 |
| 6,016,542 A | 1/2000 | Gottlieb et al. ............. | 712/225 |
| 6,026,499 A * | 2/2000 | Shirakihara et al. .......... | 714/11 |
| 6,269,478 B1 * | 7/2001 | Lautenbach-Lampe et al. .. | 717/127 |
| 6,401,217 B1 * | 6/2002 | Clark et al. ................ | 714/20 |
| 6,567,935 B1 * | 5/2003 | Figueroa .................... | 714/37 |
| 6,622,260 B1 | 9/2003 | Marisetty et al. ............ | 714/10 |
| 6,745,322 B1 | 6/2004 | Brockmann et al. .......... | 712/239 |
| 7,114,104 B1 * | 9/2006 | Bennett ..................... | 714/38 |
| 2004/0019835 A1 | 1/2004 | Marisetty et al. ............ | 714/48 |
| 2004/0205385 A1 | 10/2004 | Smith ....................... | 714/6 |
| 2006/0075301 A1 | 4/2006 | Fossum et al. .............. | 714/38 |

OTHER PUBLICATIONS

Bronevetsky et al., "Application-level Checkpointing for Shared Memory Programs", ASPLOS '04, Oct. 7-13, 2004, Boston, Massachusetts.

* cited by examiner

*Primary Examiner*—Marc Duncan
(74) *Attorney, Agent, or Firm*—Trop, Pruner & Hu, P.C.

(57) ABSTRACT

A processor includes a process identifier unit to assign process identifiers to one or more processes executed by the processor. The processor also includes an error detector to detect errors in the processor and an error posting unit to post process identifiers and error information associated with the detected errors.

29 Claims, 6 Drawing Sheets

VECTORING PROCESS-KILL ERRORS TO AN APPLICATION PROGRAM

BACKGROUND

Embodiments of the present invention relate generally to handling errors in a processor.

Single bit upsets or errors from transient faults have emerged as a key challenge in microprocessor design. These faults arise from energetic particles—such as neutrons from cosmic rays and alpha particles from packaging material—generating electron-hole pairs as they pass through a semiconductor device. Transistor source and diffusion nodes can collect these charges. A sufficient amount of accumulated charge may change the state of a logic device—such as a static random access memory (SRAM) cell, a latch, or a gate—thereby introducing a logical error into the operation of an electronic circuit. Because this type of error does not reflect a permanent failure of the device, it is termed a soft or transient error.

Soft errors become an increasing burden for microprocessor designers as the number of on-chip transistors continues to grow. The raw error rate per latch or SRAM bit may be projected to remain roughly constant or decrease slightly for the next several technology generations. Thus, unless error protection mechanisms are added or more robust technology (such as fully-depleted silicon-on-insulator) is used, a microprocessor's soft error rate may grow in proportion to the number of devices added to semiconductor devices in each succeeding generation.

Bit errors may be classified based on their impact and the ability to detect and correct them. Some bit errors may be classified as "benign errors" because they are not read, do not matter, or they can be corrected before they are used. The most insidious form of error is silent data corruption, where an error is not detected and induces the system to generate erroneous outputs. To avoid silent data corruption, designers often employ error detection mechanisms, such as parity. Error correction techniques may also be employed to fix detected errors, although such techniques cannot be applied in all situations. The ability to detect an error but not correct it may avoid generating incorrect outputs (by shutting down the affected processes before incorrect outputs are generated), but it may not provide a mechanism to recover and continue executing the affected processes when such an error occurs. Errors in this category may be called detected unrecoverable errors (DUE, or DUE errors, or DUE events).

DUE errors may be further subdivided according to whether the DUE error results in the operating system and/or another mechanism killing one or more user processes that were impacted by the error or whether the DUE error results in crashing the entire machine, including all of its processes, to prevent data corruption. The first type may be called a "process-kill DUE" error. The second type may be called a "system-kill DUE" error. A process-kill DUE is preferable over a system-kill DUE because a process-kill DUE allows the system to continue running and servicing the processes not affected by the error.

To address soft errors introduced by transient faults, microprocessor designers may include a variety of error protection features. Examples of protection features that may be used are parity, error correcting code (ECC), cyclic redundancy checking (CRC), lockstepping, radiation-hardened cells, and silicon-on insulator manufacturing technology.

Error protection features may also be included in software. Some software programs may involve extremely complex computations that may run for weeks or months on even the fastest available computers. To reduce the impact of hardware errors (that may crash programs or entire systems), some programs may implement error recovery techniques, such as application-level checkpointing, to avoid losing all their intermediate computations if the program or system crashes before the final computations are completed. Checkpointing may be added to an application program or process so that the program periodically saves its own state. Then if an error, such as a process-kill DUE, results in the application program or process being killed, halted, or shut down, recovery may be made by restarting execution of the application program or process from the checkpoint.

Upon encountering a process-kill DUE error, conventional computer systems inform the operating system, which may have no option but to kill the program(s) affected by the error. Unfortunately, conventional computer systems do not provide a way for a hardware error, such as a process-kill DUE, to be vectored back to an application-level process to allow the application program to trigger or handle its own recovery. Thus, when an application program crashes, valuable computing time may be lost waiting for a user to intervene and restart the program.

A need thus exists to vector process-kill errors to an application program.

BRIEF DESCRIPTION OF THE DRAWINGS

Various embodiments of the present invention are illustrated by way of example and not limitation in the figures of the accompanying drawings, in which like references indicate similar elements.

DETAILED DESCRIPTION

A method, apparatus, and system for vectoring process-kill errors to an application program are described. In the following description, for purposes of explanation, numerous specific details are set forth in order to provide a thorough understanding of embodiments of the invention. It will be apparent, however, to one skilled in the art that embodiments of the invention can be practiced without these specific details. In other instances, structures and devices are shown in block diagram form in order to avoid obscuring embodiments of the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
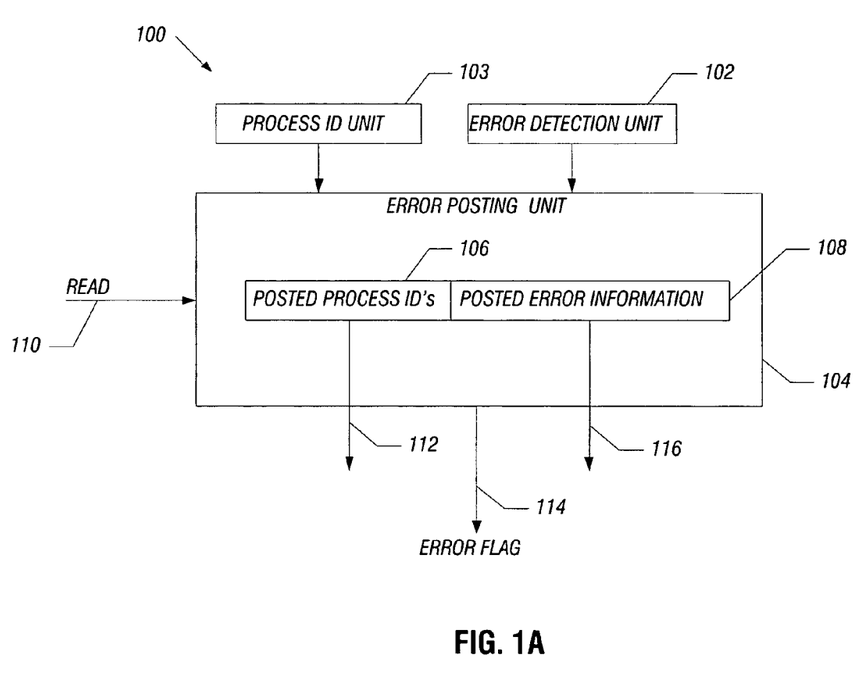
FIG. 1A is a block diagram of an error detection and posting unit in accordance with one embodiment of the present invention.

Referring now to FIG. 1A, shown is a block diagram of an error detection and posting unit 100 in accordance with one embodiment of the present invention. The error detection and posting unit 100 may include an error detection unit 102 to detect hardware errors, such as soft or transient errors, in a processor. In one embodiment, the error detection unit 102 may include parity checkers in various parts of the processor. In one embodiment, the error detection unit 102 may include a variety of error detection mechanisms in the processor.

An operating system may assign process identifiers to the processes or programs being executed by the processor. In one embodiment, each address in the processor associated with a process or program may have the same process identifier. The error detection and posting unit 100 may include a process identifier (ID) unit 103 to associate the process identifiers with some or all of the hardware units in the processor. In one embodiment, the process ID unit 103 associates a process identifier with each processor hardware unit involved in the execution of a process or program. In one embodiment, the process ID unit 103 associates a process identifier with each processor hardware unit involved in the execution of a process or program and also associates the process identifier with each address in the processor associated with the process or program. For example, process identifiers may be stored along with addresses in a processor's store buffer, merge buffer, and translation buffer. A store buffer may be used to hold store instructions that are being executed speculatively by the processor. A merge buffer may be used to collect multiple writes to a cache into a single cache block and then write one or more cache blocks to the cache, instead of writing individual data words separately. A translation buffer may be used in a processor to translate virtual addresses to physical addresses. Storing the associated process identifiers with addresses in the processor may allow detected errors to be associated with their corresponding process or program.

Still referring to FIG. 1A, in one embodiment, the assigned process identifiers may flow through the processor along with each address to which they are assigned such that each address in the processor associated with a program or process is accompanied by a process identifier. When an error is the detected by error detection unit 102, the associated process identifier may be used to determine which program or process is associated with the error. Identifying the application program or process affected by an error may allow only that application program or process to be killed (e.g., a process-kill DUE instead of a system-kill DUE) and may be used, according to embodiments of the present invention, to invoke or trigger an application-level error recovery mechanism.

The error detection and posting unit 100 may include an error posting unit 104 to store posted process identifiers (IDs) 106 and posted error information 108 associated with detected errors. In one embodiment, the posted error information 108 may include an error type associated with each detected error. In one embodiment, the posted error information 108 may include an address associated with each detected error. In one embodiment, the posted error information 108 may include information regarding where each detected error occurred in the processor (e.g., which processor structure or unit). The posted error information 108 may include other types of information relevant to identifying, analyzing, and/or handling detected errors.

Still referring to FIG. 1A, in one embodiment, the error posting unit 104 posts (or makes available) the posted process IDs 106 and associated posted error information 108 such that other error units in the processor may determine when an error has been detected and the process(es) associated with the detected error. In one embodiment, the error posting unit 104 may make the posted process IDs 106 and associated posted error information 108 available on signals 112 and 116, respectively. In one embodiment, the posted process IDs 106 and associated posted error information 108 may be read from the error posting unit 104 by asserting a read signal 110. In one embodiment, the error posting unit 104 may generate an error flag 114 to provide a flag or alert that one or more detected errors are posted in the error posting unit 104.

Figure 1B:
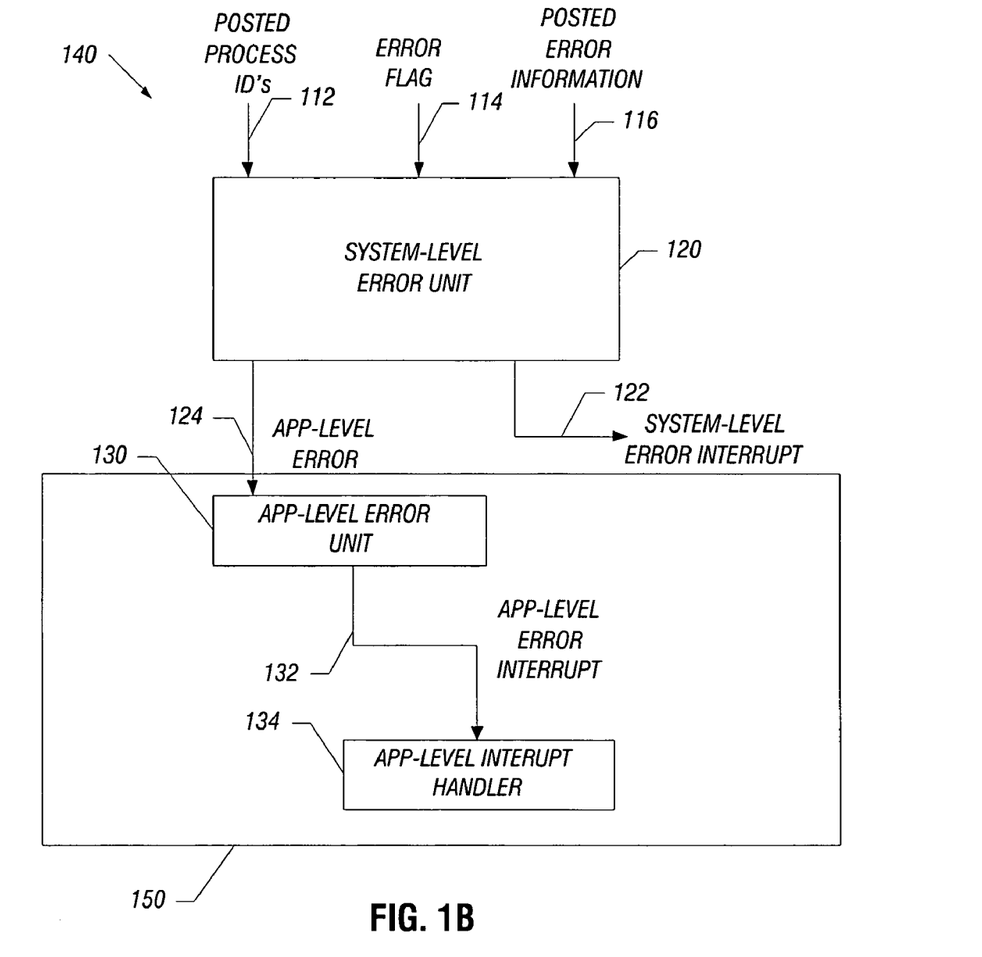
FIG. 1B is a block diagram of a system and application level error handling unit in accordance with one embodiment of the present invention.

In one embodiment, the error detection and posting unit 100 of FIG. 1A may be combined with the system and application level error handling unit 140 shown in FIG. 1B.

Referring now to FIG. 1B, shown is a block diagram of a system and application level error handling unit 140 in accordance with one embodiment of the present invention. The system and application level error handling unit 140 may include a system-level error unit 120 and an application-level unit 150. The system-level error unit 120 may receive the posted process IDs 106, associated posted error information 108, and error flag 114 from the error posting unit 104 via signals 112, 116, and 114, respectively. In one embodiment, the system-level error unit 120 may read (by asserting the read signal 110) the posted process ID 106 and associated posted error information 108 when the error flag 114 is asserted.

In one embodiment, the system-level error unit 120 may determine, based on the posted process ID 106 and associated posted error information 108, whether a posted error is associated with an application program or process and, if so, forward the posted process ID 106 and associated posted error information 108 to the application-level unit 150 on signals 124. In one embodiment, the system-level error unit 120 may generate a system-level error interrupt 122 if the detected error is determined to be associated with a system-level process or, for some reason, should be handled at the system-level.

Still referring to FIG. 1B, the application-level unit 150 may include an application-level error unit 130 and an application-level interrupt handler 134. The application-level error unit 130 may determine, based on the forwarded posted process ID 106 and associated posted error information 108, which application program or process is associated with a detected error and how the error should be handled. For example, the application-level error unit 130 may determine whether the application program has its own error recovery algorithm (such as application-level checkpointing), whether a generic application-level error handler should be used, and/or whether the application program needs to be killed. In one embodiment, the application-level error unit 130 may generate an application-level error interrupt 132 to trigger an application-level interrupt handler 134 to execute appropriate error recovery and handling for the application program or process associated with the detected error.

In one embodiment, the application-level interrupt handler 134 may be an application-level error handler associated with the application program associated with the error. In one embodiment, the application-level interrupt handler 134 may initiate or trigger recovery of the application affected by the error by initiating a recovery and rollback operation based on application-level checkpointing. In one embodiment, the application-level interrupt handler 134 may be registered with the operating system.

Figure 1C:
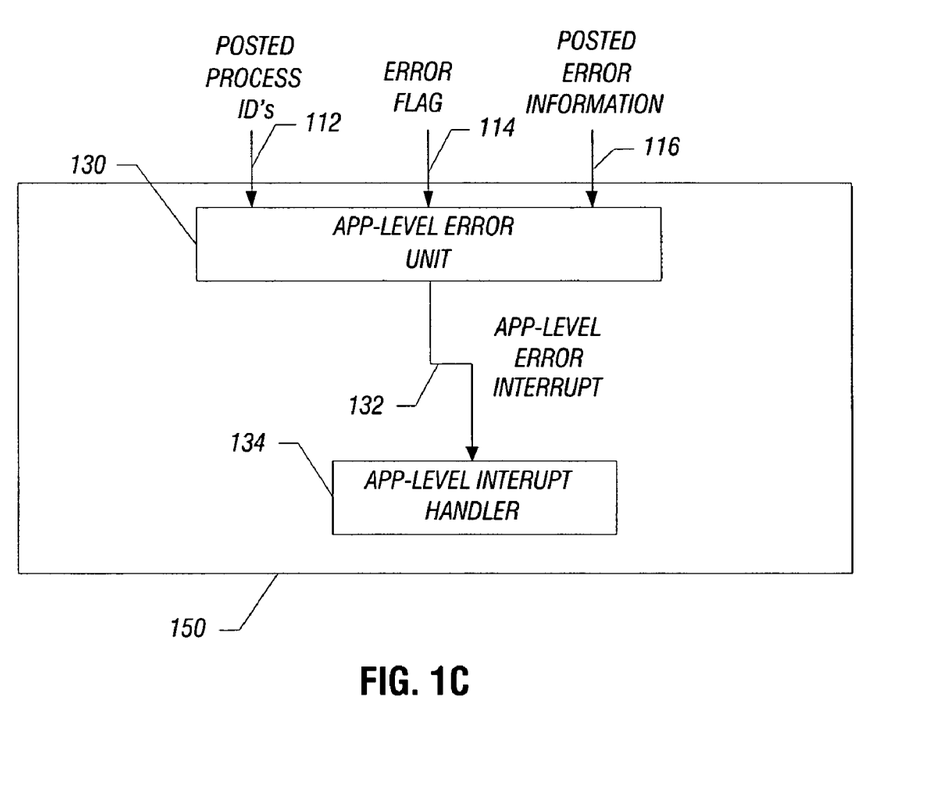
FIG. 1C is a block diagram of an application-level error handling unit in accordance with one embodiment of the present invention.

In one embodiment, the error detection and posting unit 100 of FIG. 1A may be combined with the application-level unit 150 as shown in FIG. 1C.

Referring now to FIG. 1C, the posted process IDs 106, associated posted error information 108, and error flag 114 may be provided directly to the application-level error unit 130 via signals 112, 116, and 114, respectively, rather than being forwarded from the system-level error unit 120 as shown in FIG. 1B. For example, this may be done to prevent the system-level error unit 120 from unnecessarily killing an application program or crashing the system when less drastic error handling measures are possible. For example, the system-level error unit 120 and other system-level error mechanisms may unknowingly shut down an application program that has checkpoint and restart capabilities or crash the system even though application-level recovery is possible.

Figure 1D:
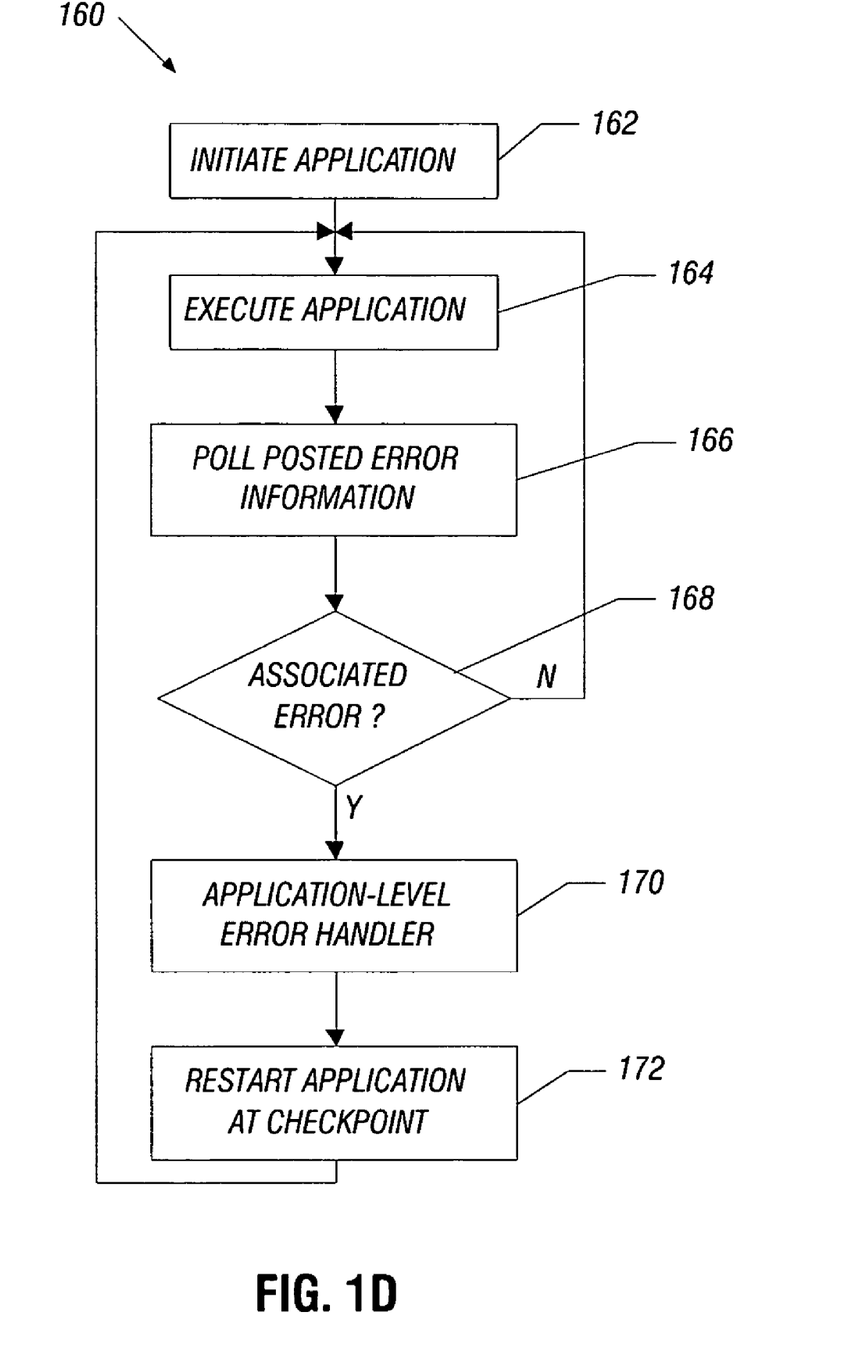
FIG. 1D is a flow diagram illustrating an application-level error handling method according to one embodiment of the present invention.

Referring now to FIG. 1D, shown is a flow diagram illustrating an application-level error handling method 160 according to one embodiment of the present invention. This method includes a polling mechanism for a program, such as an application program or process, to determine when a detected error is associated with that program. The method begins with the initiation of an application program (block 162) and execution of the application program (block 164). For example, a user may initiate execution of a complex computational weather forecast program on a computer system.

The application program may periodically poll posted error information (block 166) and determine if any detected errors are associated with the application program (diamond 168). In one embodiment, the application program may determine whether any posted errors are associated with the application program by comparing the posted process IDs 106 (of FIG. 1A) with the application program's assigned process identifier. In one embodiment, the posted process IDs 106 and associated posted error information 108 may be stored in an error posting unit 104 and read by the application program by asserting the read signal 110 (of FIG. 1A). In one embodiment, the application program may poll periodically after an elapsed time. In one embodiment, the application program may poll prior to every store or uncached load instruction to prevent silent data corruption leaks.

If the polling does not identify an error associated with the application program (diamond 168), the method may return to normal execution of the application program (block 164). If the polling identifies an error associated with the application program (diamond 168), it may initiate an application-level error handler (block 170). In one embodiment, the application-level error handler (block 170) may have a checkpoint and restart algorithm and the application program may restart the application at a checkpoint (block 172) and resume execution of the program from that point (block 164). In one embodiment, the application-level error handler (block 170) may prevent the application program from being killed, halted, or shut down prior to restarting the application at the checkpoint (block 172). In this manner, an application program may be able to trigger its own recovery by having the hardware vector a process-kill DUE error to an application program's error recovery routine.

Figure 2:
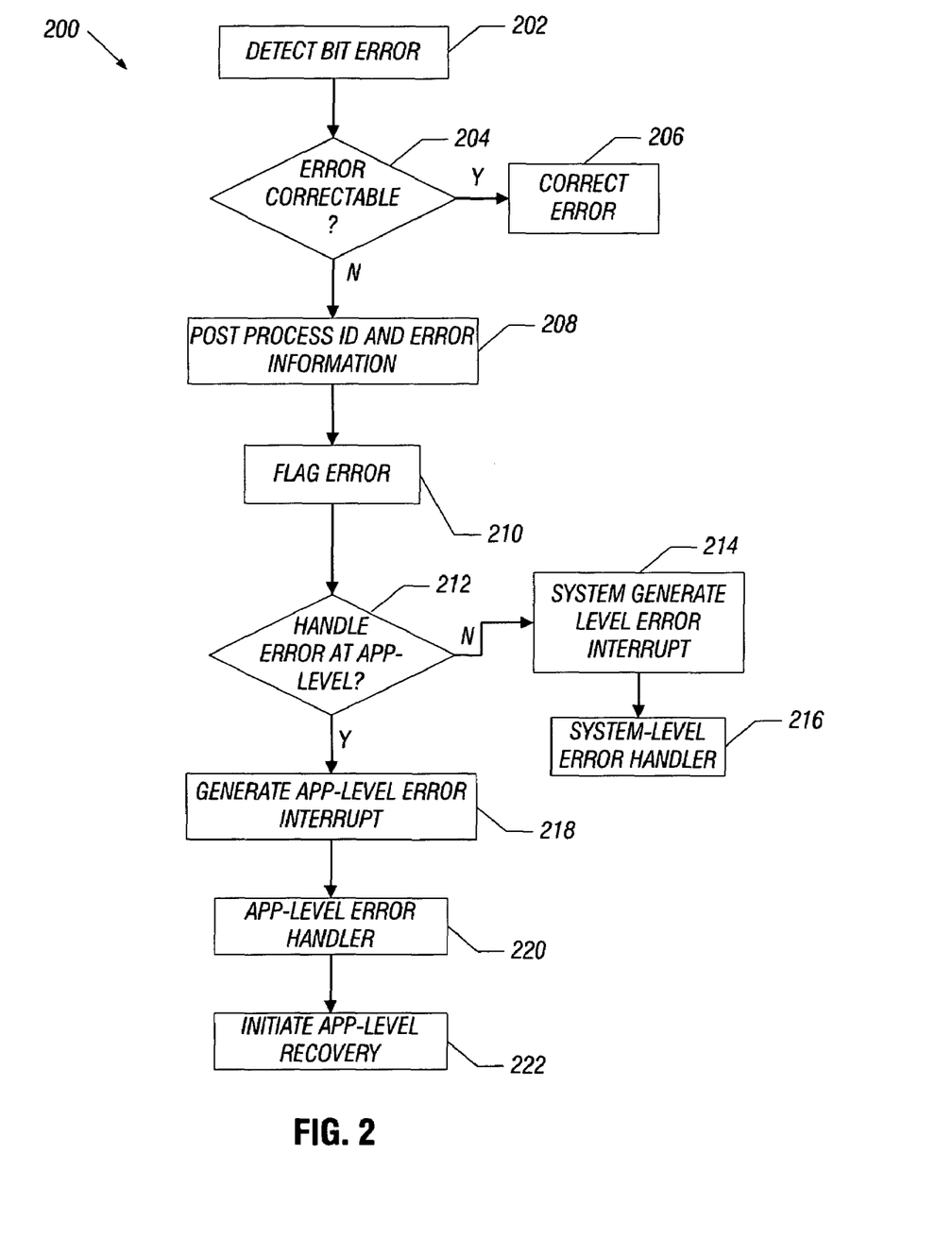
FIG. 2 is a flow diagram illustrating an error handling method according to one embodiment of the present invention.

Referring now to FIG. 2, shown is a flow diagram illustrating an error handling method 200 according to one embodiment of the present invention. The method begins by detecting an error in a processor (block 202), such as a soft or transient hardware error, and then determines whether the detected error is correctable (diamond 204). If so, the error is corrected (block 206) by an error correction mechanism or algorithm, such as ECC. If the detected error is not correctable, the process identifier and error information associated with the error are posted or otherwise made available in the system (block 208). An error flag may be generated (block 210) to provide an alert regarding the detected error. In one embodiment, the error flag may cause system-level and/or application-level error units to evaluate the posted errors.

Still referring to FIG. 2, the posted error information may be analyzed to determine whether to handle the detected error at the application-level (e.g., by an application-level error handling mechanism) or at the system-level (e.g., by the operating system or other system-level error handling mechanism) (diamond 212). The detected error may be handled at the system-level by generating a system-level error interrupt (block 214) and initiating a system-level error handler (block 216). The detected error may be handled at the application-level by generating an application-level error interrupt (block 218) and initiating an application-level error handler (block 220). If included in the application, an application-level error recovery routine may be initiated to recover the application associated with the detected error (block 222). For example, an application's checkpoint and restart capability may be used to restart the application a checkpoint. In one embodiment, the application-level error handler (block 220) and/or the application level recover routine (block 222) may prevent an application corrupted by a hardware error (such as a process-kill DUE error) from being killed. In one embodiment, the application-level error handler (block 220) and/or the application level recover routine (block 222) may allow application corrupted by a hardware error (such as a process-kill DUE error) to trigger its own recovery via an application-level recovery routine.

Embodiments may be implemented in logic circuits, state machines, microcode, or some combination thereof. Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), dynamic random access memories (DRAMs), erasable programmable read-only memories (EPROMs), flash memories, electrically erasable programmable read-only memories (EEPROMs), magnetic or optical cards, or any type of media suitable for storing electronic instructions.

Figure 3:
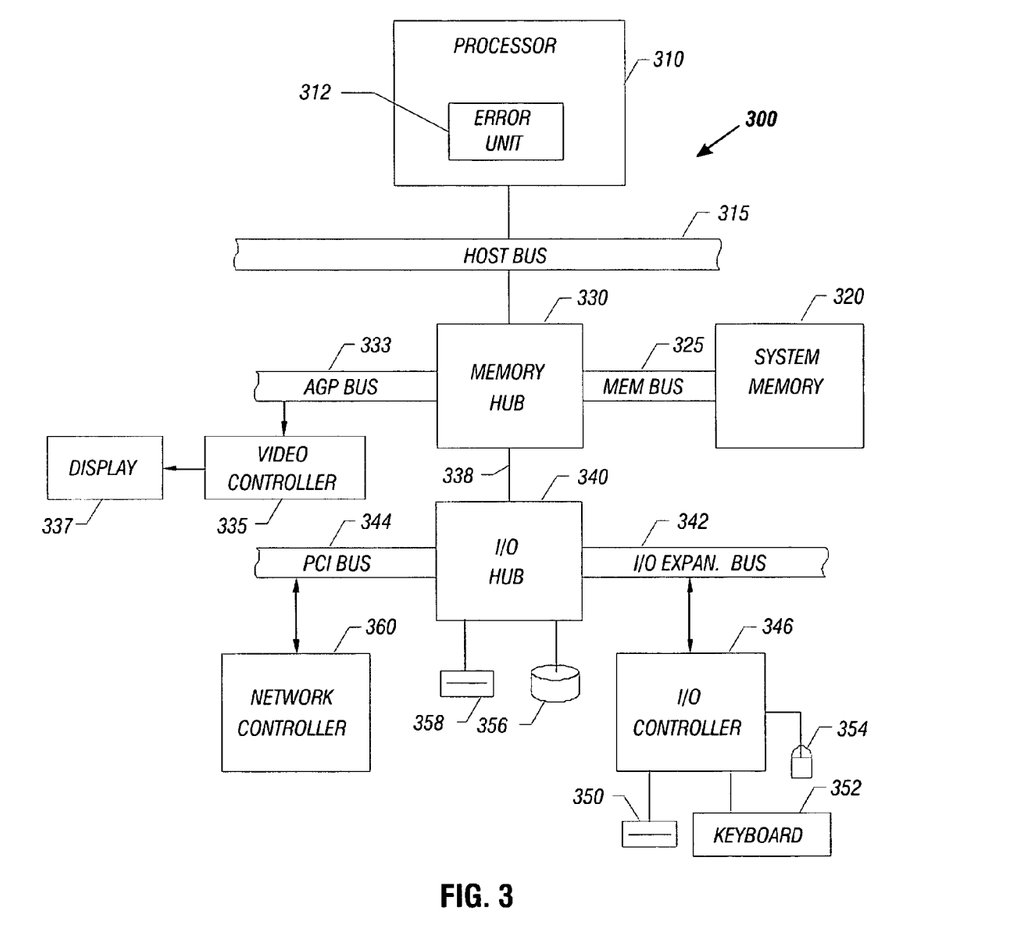
FIG. 3 is a block diagram of a computer system with which embodiments of the invention may be used.

Example embodiments may be implemented in software for execution by a suitable computer system configured with a suitable combination of hardware devices. FIG. 3 is a block diagram of computer system with which embodiments of the invention may be used.

Referring now to FIG. 3, shown is a block diagram of computer system 300 with which embodiments of the invention may be used. In one embodiment, computer system 300 includes a processor 310, which may include a general-purpose or special-purpose processor such as a microprocessor, microcontroller, a programmable gate array (PGA), and the like. As used herein, the term "computer system" may refer to any type of processor-based system, such as a desktop computer, a server computer, a laptop computer, or the like, or other type of host system.

The processor 310 may include an error unit 312 which may be implemented according to various embodiments of the present invention. The error unit 312 may provide the ability to vector process-kill errors to an application program. In one embodiment, vectoring process-kill errors to an application program may prevent the associated process from being killed if the application-level error can be handled by an application-level error recover mechanism or algorithm.

The processor 310 may be coupled over a host bus 315 to a memory hub 330 in one embodiment, which may be coupled to a system memory 320 (e.g., a dynamic RAM) via a memory bus 325. The memory hub 330 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 330 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated June 1995. The I/O expansion bus 342 may be coupled to an I/O controller 346 that controls access to one or more I/O devices. As shown in FIG. 3, these devices may in one embodiment include storage devices, such as a floppy disk drive 350 and input devices, such as keyboard 352 and mouse 354. The I/O hub 340 may also be coupled to, for example, a hard disk drive 356 and a compact disc (CD) drive 358, as shown in FIG. 3. It is to be understood that other storage media may also be included in the system.

The PCI bus 344 may also be coupled to various components including, for example, a network controller 360 that is coupled to a network port (not shown). Additional devices may be coupled to the I/O expansion bus 342 and the PCI bus 344, such as an input/output control circuit coupled to a parallel port, serial port, a non-volatile memory, and the like.

Thus, a method, apparatus, and system for vectoring process-kill errors to an application program have been described. While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   a process identifier unit to associate one or more process identifiers with one or more corresponding processes executed by a processor, and to associate the process identifiers with addresses in the processor associated with the processes such that errors detected in the processor have an associated process identifier;
   an error detector to detect errors, including a first error, in the processor, wherein the first error is associated with a first process and a first process identifier; and
   an error posting unit to post process identifiers and error information associated with the detected errors, including the first process identifier and a first error information associated with the first error.

2. The apparatus of claim 1, further comprising an application-level error unit to generate an application-level interrupt if the first process is an application-level process.

3. The apparatus of claim 2, further comprising an application-level interrupt handler associated with the application-level process to handle the first error at an application-level in response to the application-level interrupt.

4. The apparatus of claim 3, wherein the application-level interrupt handler to restart the application-level process at a checkpoint without user intervention.

5. The apparatus of claim 1, further comprising a system-level error unit to generate a system-level interrupt in response to the first error or to forward the first error information to an application-level error unit if the first process is an application-level process, the application-level error unit to generate an application-level interrupt.

6. The apparatus of claim 5, further comprising:
   a system-level interrupt handler to handle the first error at a system-level in response to the system-level interrupt; and
   an application-level interrupt handler associated with the application-level process to handle the first error at an application-level in response to the application-level interrupt.

7. The apparatus of claim 6, wherein the application-level interrupt handler to restart the application-level process at a checkpoint without user intervention.

8. The apparatus of claim 1, further comprising:
   a polling unit to poll the error posting unit to determine if one or more of the posted process identifiers is associated with an application-level process; and
   an application-level error handler associated with the application-level process to handle the first error at an application-level if the first process identifier is associated with the application-level process.

9. The apparatus of claim 8, wherein the application-level error handler to restart the first process at a checkpoint without user intervention.

10. A method comprising:
    associating one or more process identifiers with one or more hardware units of a processor involved in execution of one or more corresponding processes executed by a processor;
    detecting errors, including a first error, in the processor, wherein the first error is associated with a first process and a corresponding first process identifier; and
    posting process identifiers and error information associated with the detected errors, including the first process identifier and a first error information associated with the first error, the first error information to indicate in which hardware unit the first error occurred.

11. The method of claim 10, further comprising associating the process identifiers with addresses in the processor associated with the processes such that errors detected in the processor have an associated process identifier.

12. The method of claim 10, further comprising generating an application-level interrupt if the first process is an application-level process.

13. The method of claim 12, further comprising handling the first error at an application-level in response to the application-level interrupt.

14. The method of claim 13, further comprising restarting the application-level process at a checkpoint without user intervention.

15. The method of claim 10, further comprising generating a system-level interrupt in response to the first error or forwarding the first error information to an application-level error unit if the first process is an application-level process, the application-level error unit generating an application-leval interrupt.

16. The method of claim 15, further comprising:
- handling the first error at a system-level in response to the system-level interrupt; and
- handling the first error at an application-level in response to the application-level interrupt.

17. The method of claim 16, further comprising restarting the application-level process at a checkpoint without user intervention.

18. The method of claim 10, further comprising:
- polling the posted process identifiers to determine if one or more of the posted process identifiers is associated with an application-level process; and
- handling the first error at an application-level if the first process identifier is associated with the application-level process.

19. The method of claim 18, further comprising restarting the first process at a checkpoint without user intervention.

20. A system comprising:
- a processor to execute one or more processes;
- a dynamic random access system memory coupled to store instructions for use by the processor;
- a process identifier unit to associate one or more corresponding process identifiers with the one or more processes and to associate the process identifiers to addresses in the processor associated with the processes such that errors detected in the processor have an associated process identifier;
- an error detector to detect errors, including a first error, in the processor, wherein the first error is associated with a first process and a first process identifier; and
- an error posting unit to post process identifiers and error information associated with the detected errors, including the first process identifier and a first error information associated with the first error.

21. The system of claim 20, further comprising an application-level error unit to generate an application-level interrupt if the first process is an application-level process.

22. The system of claim 20, further comprising a system-level error unit to generate a system-level interrupt in response to the first error or to forward the first error information to an application-level error unit if the first process is an application-level process, the application-level error unit to generate an application-level interrupt.

23. An article comprising a computer-readable storage medium containing instructions that when executed enable a system to:
- poll process identifiers corresponding to detected hardware errors in a processor by a first application program to determine whether one or more of the process identifiers is associated with a first application-level process of the first application program; and
- handle a first detected hardware error with an error recovery routine of the first application program if a corresponding first process identifier is associated with the first application-level process.

24. The article of claim 23, further comprising instructions that when executed enable the system to save the state of the application-level process.

25. The article of claim 24, further comprising instructions that when executed enable the system to restore the saved state of the application-level process without user intervention.

26. A processor comprising:
- first logic to associate a first process identifier with a first hardware unit on which a first process is executed;
- second logic to detect a first error in the first process;
- third logic to store the first process identifier and first error information associated with the first error to indicate that the first error occurred in the first hardware unit.

27. The processor of claim 26, wherein the first logic is to associate the first process identifier with an address associated with the first process.

28. The processor of claim 27, wherein the third logic is to store the first error information including the address associated with the first process.

29. The processor of claim 26, further comprising a first application program to execute on the processor, the first application program including the first process, wherein the first application program is to receive the first process identifier and the first error information and to vector the processor to an error recovery routine of the first application program, wherein the first error is a process-kill hardware error.

* * * * *

UNITED STATES PATENT AND TRADEMARK OFFICE
CERTIFICATE OF CORRECTION

PATENT NO. : 7,373,558 B2  Page 1 of 1
APPLICATION NO. : 10/947961
DATED : May 13, 2008
INVENTOR(S) : Mukherjee It is certified that error appears in the above-identified patent and that said Letters Patent is hereby corrected as shown below:

Column 8:
Line 67, "leval" should be --level--.

Signed and Sealed this

Fifteenth Day of July, 2008

JON W. DUDAS
*Director of the United States Patent and Trademark Office*